United States Patent [19]

Sneddon

[11] Patent Number: 5,053,660
[45] Date of Patent: Oct. 1, 1991

[54] LINEAR ACTUATORS AND LINEAR DRIVE SYSTEMS

[76] Inventor: John L. Sneddon, 18 Eilean Rise, Ellon, Aberdeenshire AB4 9NF, Scotland, Great Britain

[21] Appl. No.: 420,923

[22] Filed: Oct. 13, 1989

[30] Foreign Application Priority Data

Oct. 13, 1988 [GB] United Kingdom ............ 8824041

[51] Int. Cl.⁵ .................... H02K 7/06; F16K 31/04
[52] U.S. Cl. .................................... 310/80; 310/20; 251/129.11
[58] Field of Search ............ 310/20, 37, 75 D, 80, 310/266; 417/94, 133, 237, 510, 505; 251/23, 71, 129.01, 129.11, 129.13, 129.14, 340

[56] References Cited

U.S. PATENT DOCUMENTS

| | | | |
|---|---|---|---|
| 2,956,188 | 10/1960 | White | 251/129.11 |
| 3,461,805 | 8/1969 | Karkow | 417/568 |
| 4,145,165 | 3/1979 | Perkins et al. | 310/80 |
| 4,277,706 | 7/1981 | Isaacson | 310/80 |
| 4,789,132 | 12/1988 | Fujita et al. | 251/129.11 |

Primary Examiner—R. Skudy
Assistant Examiner—Dennis R. Haszko
Attorney, Agent, or Firm—Ratner & Prestia

[57] ABSTRACT

A linear actuator 30 set up as a powered valve comprises a stator 32 secured within a frame 34 and a rotor 38 mounted on a pair of half-shafts 40. Within the rotatable assembly are internally-threaded and oppositely-handed drive nuts 44 and 46 which are each secured to the half-shafts 40 for conjoint rotation with the rotor 38. A pair of driven members 48 and 50 are provided. The driven member 48 is externally threaded to match the internal thread of the driving nut 44, and similarly, the driven member 50 is externally threaded to match the internal thread of the driving nut 46. Since the two sets of corresponding male/female threads are oppositely handed, energization of the stator 32 to turn the rotor 38 will actuate the driven members 48 and 50 in mutually opposite directions and as the adjacent ends of the driven members 48 and 50 are formed respectively as a valve seat 54 and a valve plug 56 the valve can be opened or closed.

5 Claims, 8 Drawing Sheets

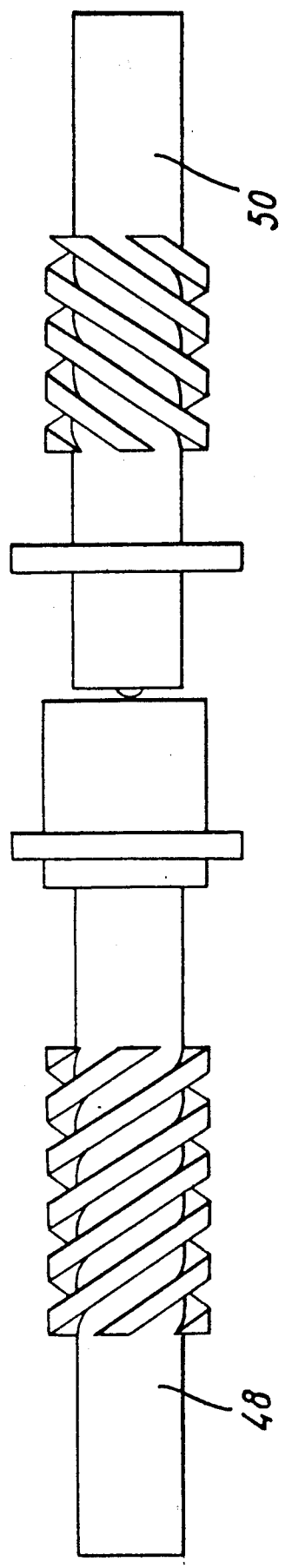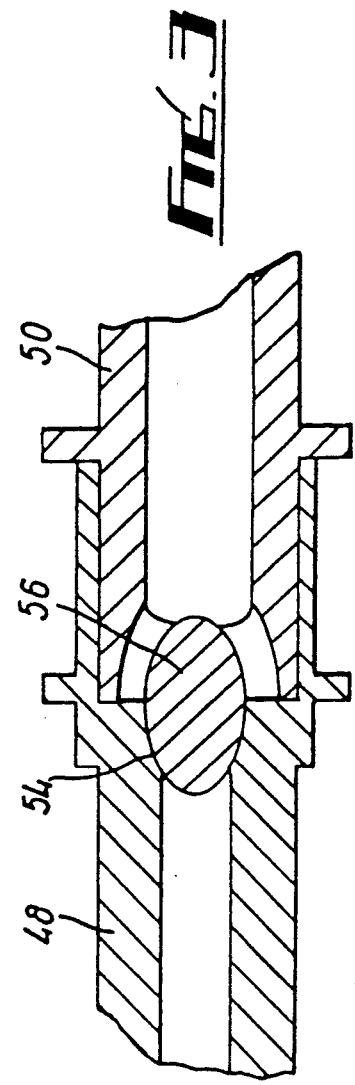

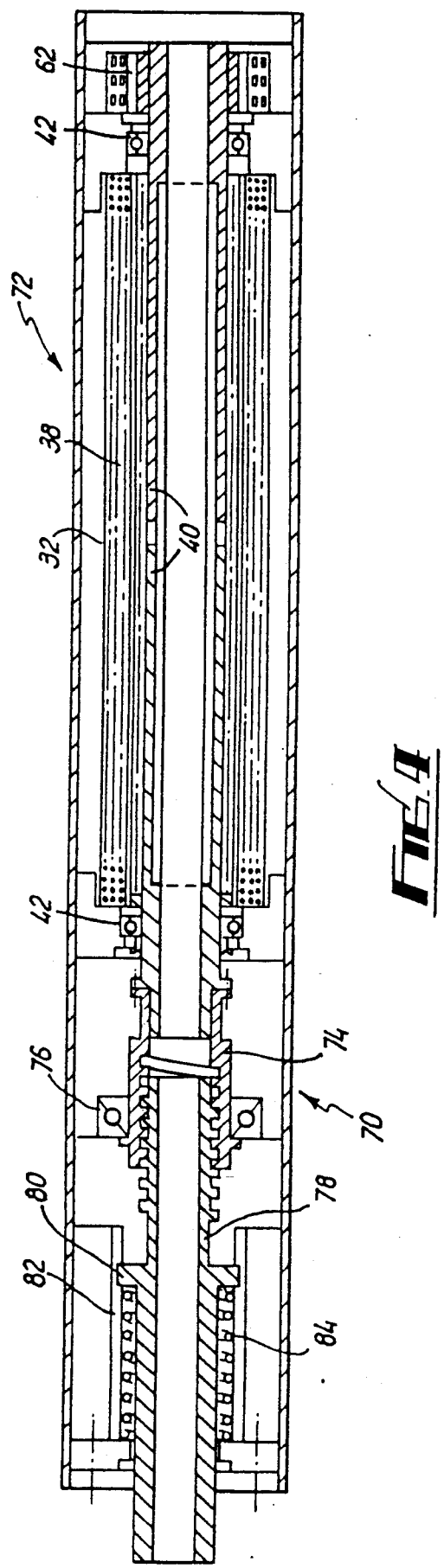

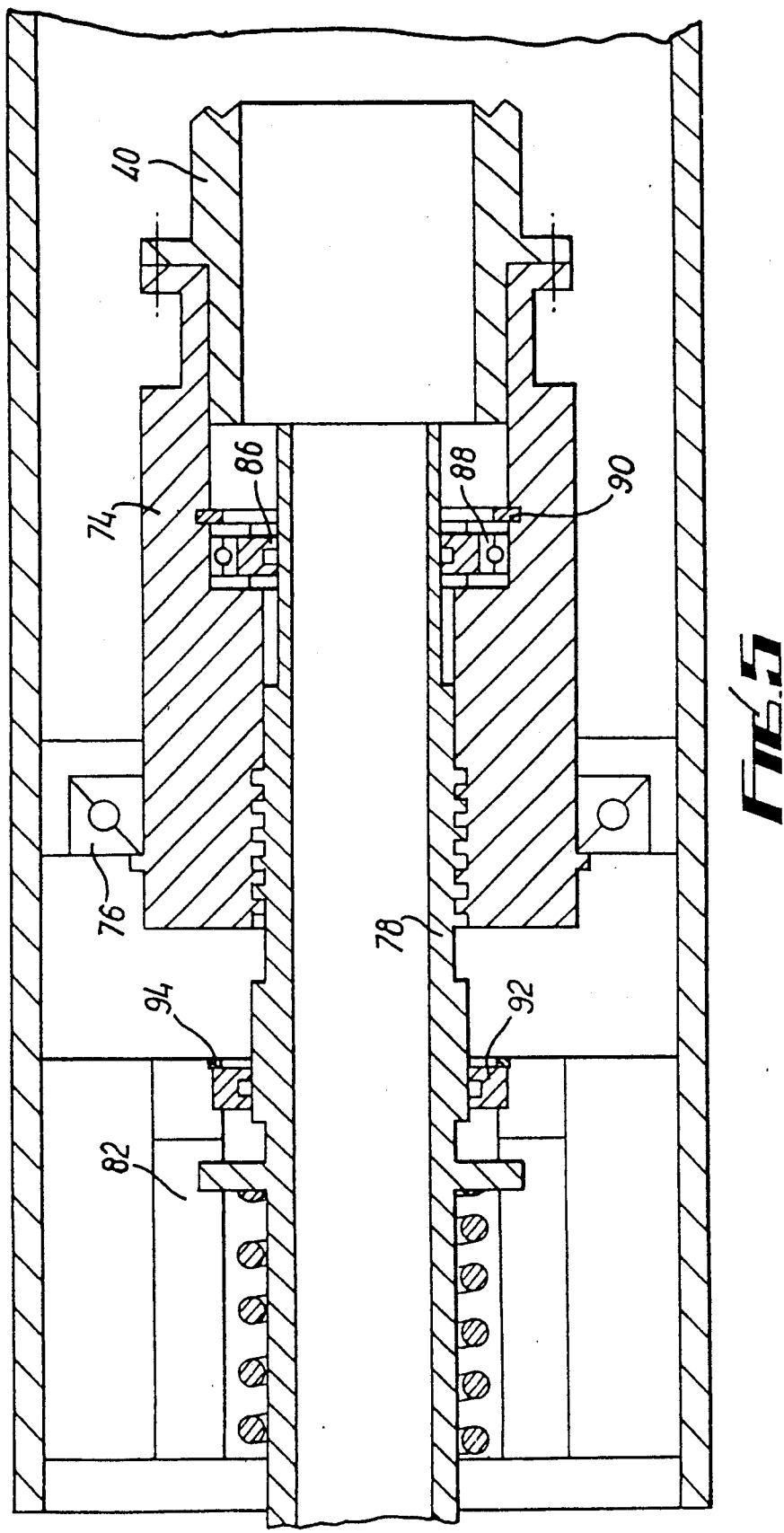

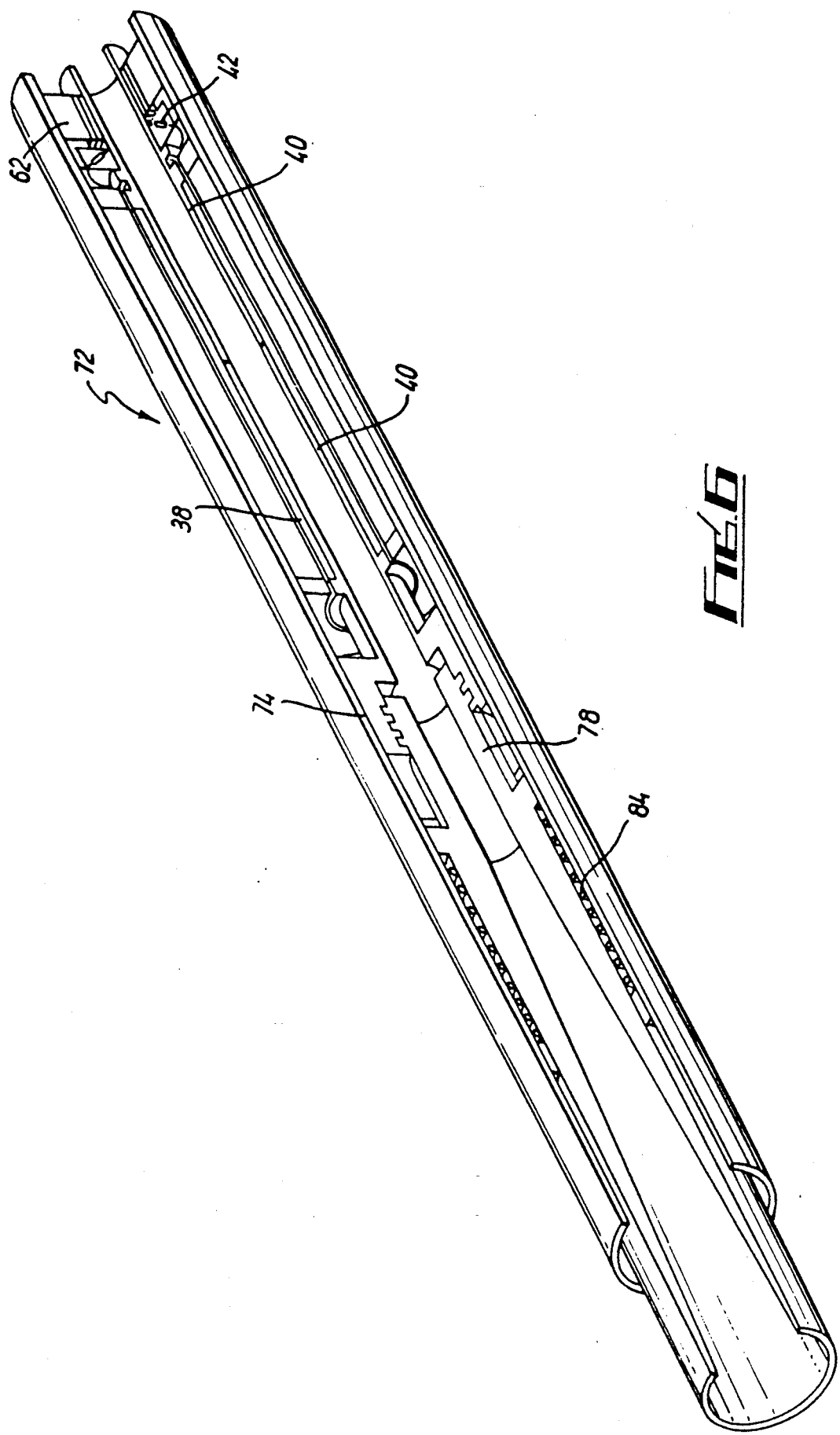

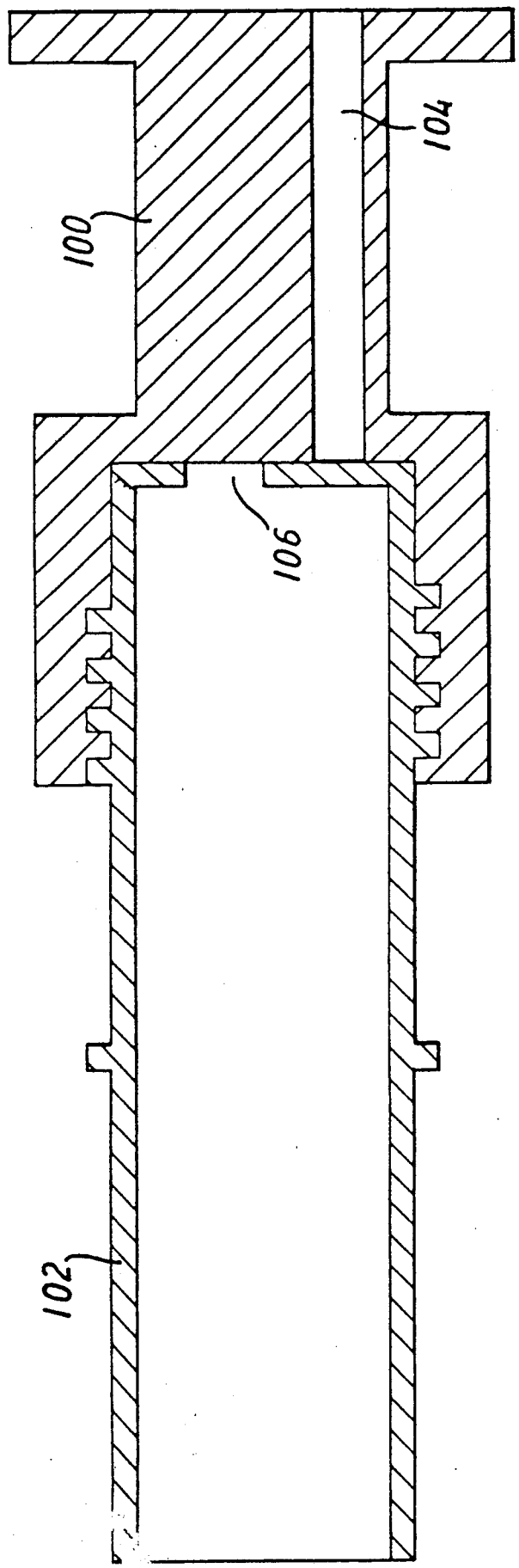

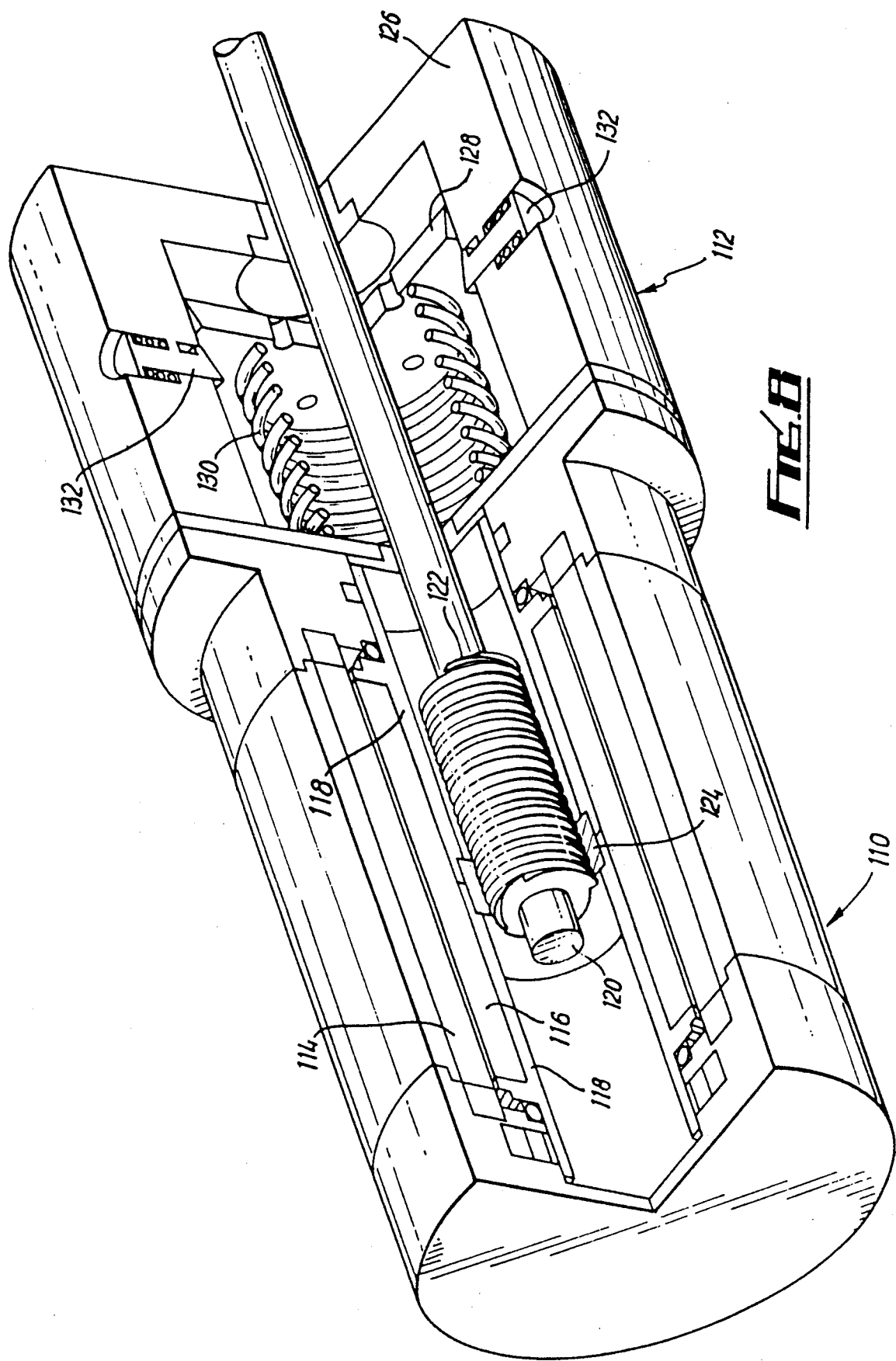

ns of the first embodiment;

LINEAR ACTUATORS AND LINEAR DRIVE SYSTEMS

This invention relates to linear actuators and linear drive systems.

SUMMARY OF THE INVENTION

According to the present invention, a linear drive assembly comprises an electric motor having a non-rotatable stator and a hollow rotor, the rotor being rotatably mounted on a pair of half-shafts to form a hollow rotatable assembly rotatable about a rotation axis, the hollow rotatable assembly providing an axial through passage along the rotation axis, at least one female-threaded driving member secured to the rotatable assembly, and at least one corresponding male-threaded driven member non-rotatably mounted for linear actuation by the driving member along the rotation axis upon rotation of the rotatable assembly about the rotation axis.

The driven member of the linear drive assembly may be mounted for non-rotatable and substantially axial movement through at least one end of the axial through passage provided by the hollow rotatable assembly, and the one driving member may be secured within the rotatable assembly between the half-shafts.

Alternatively, the one driving member may be secured to one end of the rotatable assembly with the one driven member being non-rotatably mounted for substantially linear movement substantially coaxially with the rotation axis of the rotatable assembly.

As a further alternative, the linear drive assembly may comprise two oppositely-handed female-threaded driving members secured to axially spaced-apart positions on the rotatably assembly, and two corresponding male-threaded driven members each non-rotatably mounted for linear actuation by a respective driving member in mutually opposite directions substantially along the rotation axis. The two driven members are preferably formed as matable valve members to control fluid flow in the through passage, the assembly being such that the valve members are linearly actuated in mutually opposite directions into and out of mutual contact whereby respectively to close and open the through passage to through flow of fluid.

The driven member may be a valve actuating sleeve having an axial through bore coupled to the axial through passage conjointly to provide a fluid flow passage through the linear drive assembly. The axial through bore and the axial through passage preferably have mutually different radial offsets with respect to the rotation axis, with the driving and driven members having mutual seating portions such that in one relative linear position, the seating portions are mutually seated with the axial through bore and the axial through passage mutually offset to form a controllable closure of the fluid flow passage through the linear drive assembly.

BRIEF DESCRIPTION OF THE DRAWINGS

Embodiments of the invention will now be described by way of example with reference to the accompanying drawings wherein:

FIG. 2 is a longitudinal elevation of a pair of components of the first embodiment;

FIG. 3 is a longitudinal sectional elevation of parts of the component pair of FIG. 2, in one operating position thereof;

FIG. 4 is a longitudinal sectional elevation of a second embodiment;

FIG. 5 is a longitudinal sectional elevation of part of the second embodiment of FIG. 4 to an enlarged scale, showing optional details thereof;

FIG. 6 is an isometric part-sectional elevation of a third embodiment;

FIG. 7 is a longitudinal sectional elevation of a modification of the third embodiment of FIG. 6;

FIG. 8 is an isometric part-sectional elevation of a fourth embodiment; and

DESCRIPTION OF PREFERRED EMBODIMENTS

Figure 1:
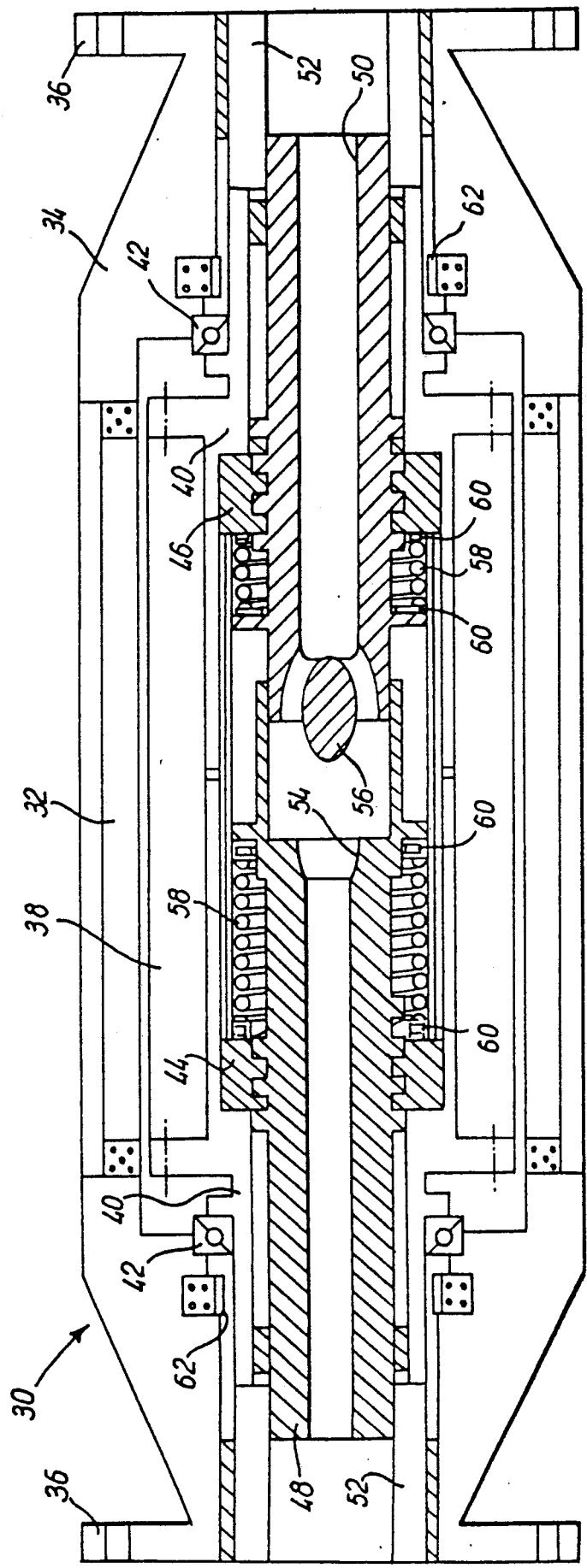
FIG. 1 is a longitudinal sectional elevation of a first embodiment.

Referring to FIG. 1, the first emobidiment is a linear actuator 30 set up as a powered valve. The actuator 30 comprises a stator 32 non-rotatably secured within a frame 34 formed as a fluid-tight housing adapted for connection as part of a fluid pipeline (not shown) by means of end flanges 36. Within the actuator 30 is a rotatable assembly comprising a rotor 38 mounted on and keyed to a pair of half-shafts 40 rotatably supported on a pair of angular contact ball bearings 42. At axially spaced-apart locations within the rotatable assembly are internally-threaded and oppositely-handed drive nuts 44 and 46 which are each secured to the half-shafts 40 for conjoint rotation with the rotor 38. This rotatable assembly forms a through passage along the axis of the actuator 30, both for mechanical movement of actuated components and for fluid flow, as will be detailed below.

Centrally mounted within the actuator 30 are a pair of driven members 48 and 50 which are linked to the frame 34 by respective couplings 52 which allow relative sliding movement while preventing mutual rotation. The driven member 48 is externally threaded to match the internal thread of the driving nut 44, and similarly, the driven member 50 is externally threaded to match the internal thread of the driving nut 46. (These external threads are separately detailed in FIG. 2).

Since the two sets of corresponding male/female threads (on 44 with 48, and on 46 with 50) are oppositely handed, and since the driven members 48 and 50 can non-rotatably slide within the through passage formed by the rotatable assembly of the actuator 30, energization of the stator 32 to turn the rotor 38 will turn the nuts 44 and 46 conjointly, and linearly actuate the driven members 48 and 50 in mutually opposite directions, i.e. axially together or apart.

The driven members 48 and 50 are hollow, with end-to-end through bores. The adjacent ends of the driven members 48 and 50 are formed respectively as a valve seat 54 and a valve plug 56. By linearly driving the valve seat 54 against the valve plug 56 as detailed in FIG. 3, the through passage previously provided by the actuator 30 is controllably throttled shut, while reverse actuation will separate the valve seat 54 from the valve plug 56, as shown in FIG. 1, to re-open the axial passage through the actuator 30. Thus if the actuator 30 is coupled into an oil pipeline or a gas pipeline (by means of the end flanges 36), the actuator 30 can act as an in-line powered valve.

It is preferred that springs 58 be provided within the rotatable assembly which tend to push the driven members 48 and 50 together. The springs 58 are conveniently located inside the half-shafts 40 and around the peripheries of the driven members 48 and 50. Anti-friction bearings 60 allow free relative rotation of these components. A suitable choice of pitch angle for the threads of the driving members 44 and 46 (necessarily matched by the corresponding threads on the driven members 48 and 50) will result in the rotary-to-linear motion conversion mechanisms formed by these thread pairs being reversible. Thus in the absence of energisation of the stator 32, suitably strong compression springs 58 will drive the members 48 and 50 together (with the rotor 38 undergoing forced reverse rotation) to bring the valve seat 54 and the valve plug 56 together. Thereby the in-line valve provided by the actuator 30 will shut automatically in the event of electrical power failure.

Automatic valve closure on de-energization of the stator 32 can be inhibited by electrically operated brakes 62 which act between the frame 34 and the half-shafts 40. If the brakes 62 are applied by energisation and release automatically on de-energization, a power failure will release the half-shafts 40 to be reverse rotated by the springs 58, thus allowing the valve to shut automatically or power failure while consuming only minimal power to hold the valve open.

Referring now to FIG. 4, this shows a different version of linear actuator in accordance with the invention, set up as a valve actuator. The linear actuator 70 shown in FIG. 4 has a motor section 72 at the right-hand side which is similar in essential respects to that of the actuator 30 described above in FIG. 1, and to which equivalent parts have been given the same reference numerals as in FIG. 1. The actuator 70 differs from the actuator 30 in that the driving member is an internally-threaded sleeve 74 mounted outboard of the motor section 72, secured to one end of one of the half-shafts 40. The sleeve 74 is radially and axially supported by a bearing 76.

The actuator 70 further comprises a male-threaded driven member 78 with radially projecting dogs 80 which mesh with axially-extending splines 82 fixed within the actuator casing to allow the driven member 78 to move axially while being restrained from rotation. The left end of the driven member 78 is intended to actuate a valve (not shown), such as a ball or flapper valve, by axial movement of the driven member 78. Movement of the driven member 78 leftwards away from the motor section 72 would normally open such a valve, while rightward movement would cause or permit the valve to shut. A compression spring 84 biases the driven member 78 in valve-closing inboard direction, and the angle of the threads linking the driving member 74 to the driven member 78 are made such as to allow both motorized rotation for valve opening, and spring-driven reverse rotation for fail-safe valve closure.

The hollow half-shafts 40 within the motor section 72, and a hollow bore through the driven member 78 together provide a through passage for fluid flow through the actuator 70 from end to end. Thus the actuator 70 can be installed in-line in a pipeline or the like to actuate an adjacent in-line valve to control fluid flow along the pipeline.

FIG. 5 shows part of the actuator 70 of FIG. 4 to an enlarged scale, to illustrate a possible seal arrangement between the driving and driven members 74 and 78. The slidable but non-rotatable driven member 78 is sealed at its inboard (right-hand) end to the rotatable but non-slidable driving member 74 by means of a flexible sliding seal 86 mounted within a bearing 88 to minimize rotary friction, the bearing 88 being retained by a circlip 90. The driven member 78 is also sealed to the splines 82 by a further flexible sliding seal 92, which is retained by its own circlip 94.

FIG. 6 is a schematic part-sectional isometric view of a linear-valve actuator generally similar to that shown in FIG. 4, but differing in detail. Equivalent parts have been accorded the same reference numerals as FIG. 4.

FIG. 7 is a sectional elevation of an internally-threaded driving member 100 and an externally-threaded driven member 102 modified to act together as a secondary valve or back-up valve to the main valve (not shown) linearly actuated by the driven member 102 in an arrangement similar to that of FIG. 4 or FIG. 6. The members 100 and 102 have their axially facing portions shaped for mutual seating when fully screwed up to the illustrated position. The driving member 100 has an axial through port 104, and the driven member 102 has an axial through port 106. The ports 104 and 106 have different positions on the facing portions of the members 100 and 102 such that when these portions are fully seated, the ports 104 and 106 are out of alignment to shut off the flow of fluid allowed along the axis of the actuator when the members 100 and 102 are not fully seated. Thus when the driven member 102 is threaded rightwards to close the main valve, the ports 104 and 106 close off to provide a secondary closure and a functional back-up to the closure of the main valve.

FIG. 8 shows a linear actuator 110 in conjunction with a combined dashpot and latch 112. As with the previous embodiments, the actuator 110 is powered by a rotary electric motor 114 whose rotor 116 is rotatably mounted on a pair of half-shafts 118 which are hollow to provide a through passage for the axially movable and non-rotatable linearly driven member 120.

The linearly driven member 120 has a multi-start helix 122 which is acted on by a correspondingly threaded nut 124 clamped between the rotor half-shafts 118.

The dashpot/latch mechanism 112 has a cylindrical casing 126 which acts as a cylinder to a dashpot piston 128 carried on the driven member 120. A compression spring 130 within the casing 126 urges the piston 128 and hence the driven member to the right (as viewed in FIG. 8). When the driven member 120 is actuated to the left by anticlockwise rotation (as viewed on the left end of the actuator 110) against the force of the return spring 130, the bevelled rim of the piston 128 latches under a circumferential row of radially movable latches 132 which are solenoid-applied and spring released. Thus the driven member 120 can be driven to an actuated position from which it will be automatically released upon power failure.

Reverting momentarily to the "in-pipe" linear actuator 30 of FIG. 1, if the driving members 44 and 46 were removed, together with the driven members 48 and 50, and the other associated components, what remains is a hollow electric motor which provides an axial through passage for flow of fluids (such as oil or gas). If a suitable fluid pump mechanism were now placed within the rotor (as is possible by reason of the demountability of the half-shafts 40, and their capability of holding a universal range of rotary articles or assemblies), the actuator 39 would be thereby converted to an in-line pump. Such a pump could be a positive displacement pump (which may be a Moineau pump), or an axial-flow hydrokinetic pump (either a single-stage pump, or a multi-stage pump). Further, such a pumping arrangement could be converted to an electrical generating system by driving the fluid side of the arrangement with fluid at a suitable flow rate and pressure, and extracting electrical power from the stator by suitable excitation of the electrical machine.

Figure 9:
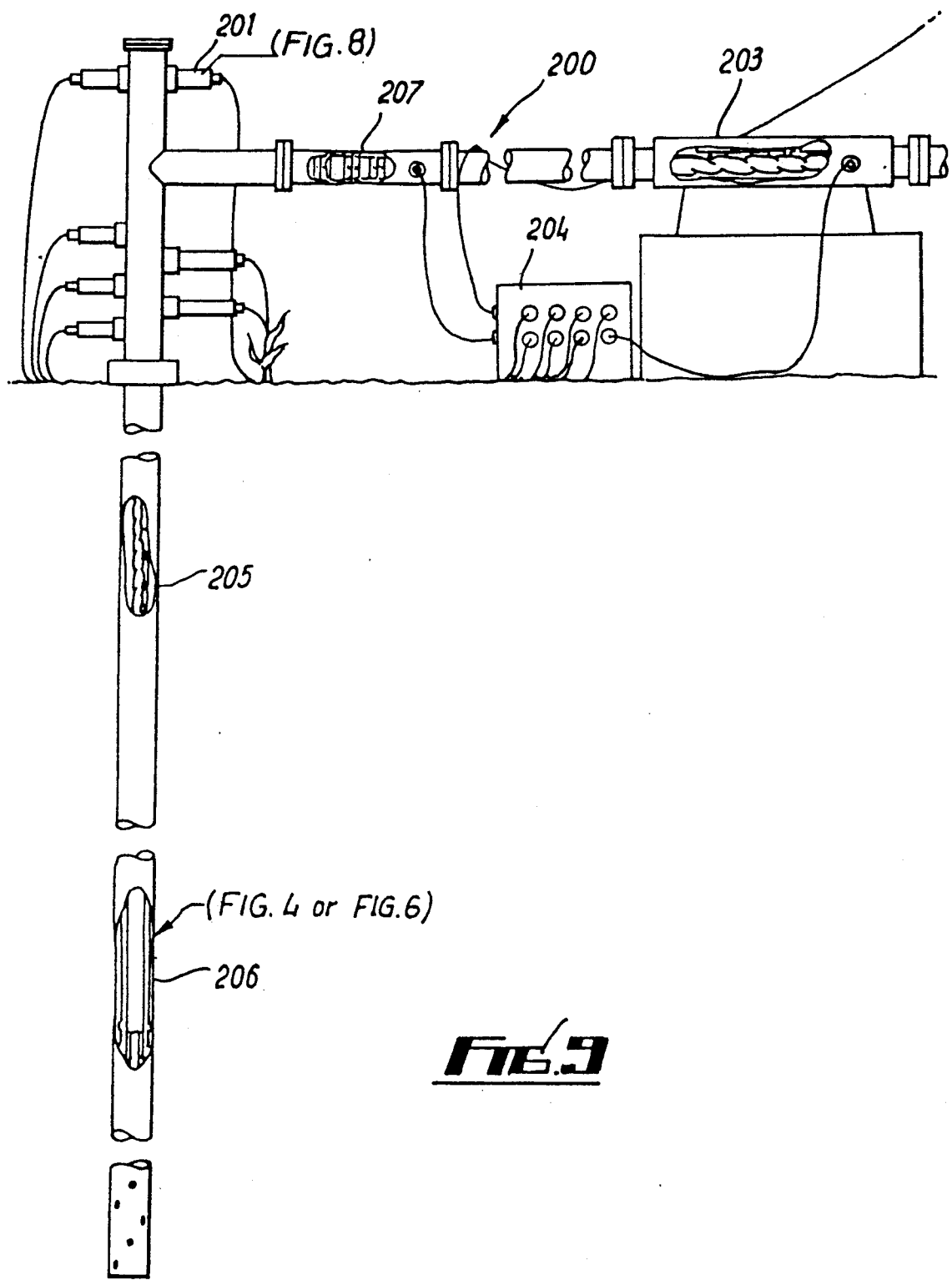
FIG. 9 is a schematic diagram of a fluid system employing certain embodiments of the invention.

FIG. 9 is a schematic diagram of a submarine well system 200 incorporating various of the above-described aspects of the invention. Item 201 is a valve actuator as shown in FIG. 8 and item 206 is a valve actuator of the type shown in FIG. 4 or alternatively that shown in FIG. 6. (Items 203 and 205 are in-line pumps as described immediately above, while item 207 is an in-line electrical generator. Item 204 is an electrical distribution system).

Modifications and improvements may be made without departing from the scope of the invention.

I claim:

1. A linear drive assembly comprising an electric motor having a non-rotatable stator and a hollow rotor, the rotor being rotatably mounted on a pair of half-shafts to form a hollow rotatable assembly rotatable about a rotation axis, the hollow rotatable assembly providing an axial through passage along the rotation axis, two oppositely-handed female-threaded driving members secured to axially spaced-apart positions on the rotatable assembly, and two corresponding male-threaded driven members each non-rotatably mounted for linear actuation by a respective said female-threaded driving member in mutually opposite directions substantially along the rotation axis upon rotation of the rotatable assembly about the rotation axis.

2. A linear drive assembly as claimed in claim 1, wherein the driven member of the linear drive assembly is mounted for non-rotatable and substantially axial movement through at least one end of the axial through passage provided by the hollow rotatable assembly, and the one driving member is secured within the rotatable assembly between half-shafts.

3. A linear drive assembly as claimed in claim 1, wherein the one driving member is secured to one end of the rotatable assembly with the one driven member being non-rotatably mounted for substantially linear movement substantially coaxially with the rotation axis of the rotatable assembly.

4. A linear drive assembly as claimed in claim 1, wherein the two driven members are preferably formed as matable valve members to control fluid flow in the through passage, the assembly being such that the valve members are linearly actuated in mutually opposite directions into and out of mutual contact whereby respectively to close and open the through passage to through flow of fluid.

5. A linear drive assembly as claimed in claim 1, 2 or 3 wherein, the driven member is a valve actuating sleeve having an axial through bore coupled to the axial through passage conjointly to provide a fluid flow passage through the linear drive assembly, the axial through bore and the axial through passage preferably having mutually different radial offsets with respect to the rotation axis, with the driving and driven members having mutual seating portions such that in one relative linear position, the seating portions are mutually seated with the axial through bore and the axial through passage mutually offset to form a controllable closure of the fluid flow passage through the linear drive assembly.

* * * * *